Dec. 26, 1944.   L. DEWAN   2,365,806
INERTIA DAMPING ARRANGEMENT FOR MEASURING INSTRUMENTS
Filed July 8, 1942

INVENTOR
Leon Dewan
BY
Edw. S. Higgins
ATTORNEY

Patented Dec. 26, 1944

2,365,806

UNITED STATES PATENT OFFICE 2,365,806

INERTIA DAMPING ARRANGEMENT FOR MEASURING INSTRUMENTS

Leon Dewan, New York, N. Y., assignor of one-half to Percival W. Andrews, New York, N. Y.

Application July 8, 1942, Serial No. 450,153

11 Claims. (Cl. 73—430)

This invention relates generally to measuring instruments and more particularly to such instruments whose moving pointer makes an electrical contact at a point along its path of travel.

Measuring instruments, particularly electric meters, have the disadvantage that when used on moving vehicles their pointers respond to the motion of the vehicles so that the reading is uncertain. This is especially objectionable where the pointer makes an electrical contact at a certain point in the reading, such as a meter relay, for example, which is so delicate as to work on microamperes and yet operates a contact at a certain degree. One jolt may cause the pointer to swing over and make a false contact.

According to this invention, a freely balanced wheel is geared to the rotor of the meter. This wheel is of such rotative inertia relative to the meter part that if a sudden rotative force is applied to the whole instrument, one that would cause the pointer to swing over, the rotor and the wheel oppose each other with equal force at the point of their engagement with the result that neither one moves.

An object of the present invention is to prevent accidental movement of the moving parts of such instruments but permit the ordinary functioning of the instrument, particularly in instruments used on moving vehicles and the like.

Another object is to prevent movement of the system when a sudden rotative force is applied to the whole system yet permit the ordinary free functioning of the system.

A further object is to prevent movement of the system when a sudden straight line force such as produced by jolting is applied to the whole system yet will permit the ordinary free functioning of the system.

Still another object is to provide such a device that is readily combined with the conventional electric meter without any alteration of said meter.

Yet another object is to provide such a device that is positive in operation.

A further object is to provide a device of this kind that is simple in construction and inexpensive to manufacture.

The invention will be understood from the description thereof to follow taken in connection with the accompanying drawing in which—

Figure 1:
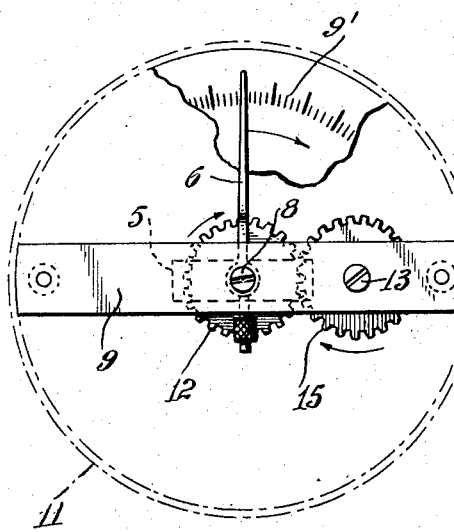
Fig. 1 is a front view of an electric meter embodying one form of my invention, with the outer casing and face thereof removed.
Figure 2:
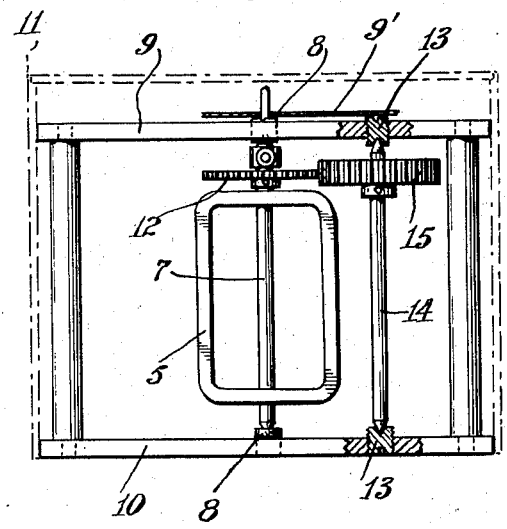
Fig. 2 is a side elevational view thereof.

Referring to the drawing, in Figs. 1 and 2, the rotor 5 and the pointer 6 of a common type of electric meter are mounted on a shaft 7 which turns in the jewel bearings 8 on the upper and lower cross bars 9 and 10, respectively. The pointer 6 moves over a scale 9' as will be understood. These parts are enclosed in a casing shown in dotted lines at 11. A gear wheel 12 is fixed to the shaft 7 adjacent its upper end.

The other elements of the electric meter such as the field magnet, spiral spring, etc., are omitted for the sake of clearness and form no part of the invention.

Another pair of jewel bearings 13 on the same bars 9 and 10 support a shaft 14. This shaft carries gear wheel 15 which in this case is equal in diameter to gear 12, is free, well balanced and comparatively heavy to equal in weight the combined weight of rotor 5, gear 12 and pointer 6.

The parts mounted on shaft 7 are also in balance with relation to it. A quick twist of the whole instrument causes a tendency of both shafts 7 and 14 to be turned but since they tend to oppose each other in turning, as shown by the arrows, at the point where gears 12 and 15 are in engagement, and since the rotative masses mounted on both shafts are of equal inertia, the opposing forces will be equal and neither shaft will move.

Furthermore a sudden straight line acceleration of the instrument will not produce motion of the pointer since the masses on each shaft are balanced individually thereto.

Figure 3:
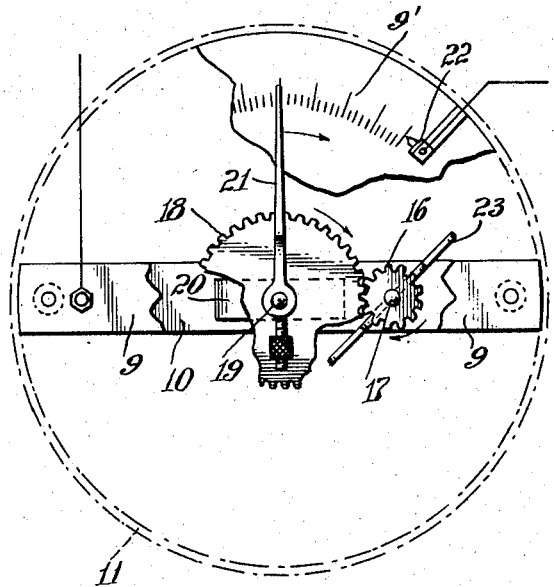
Fig. 3 is a view similar to Fig. 1 of a modified form of my invention.
Figure 4:
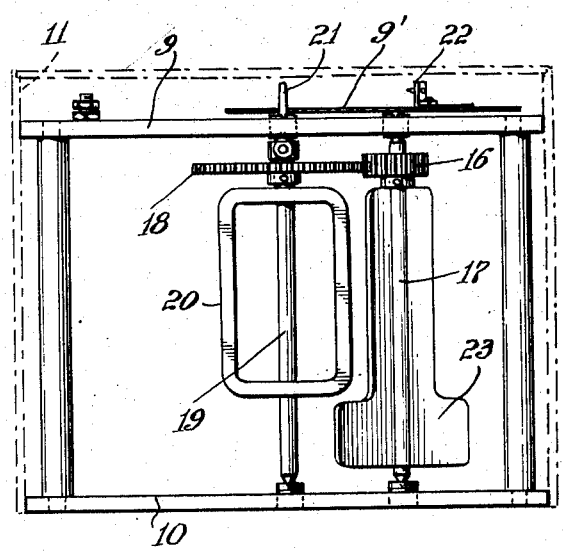
Fig. 4 is a side elevational view of the form shown in Fig. 3.
Figure 5:
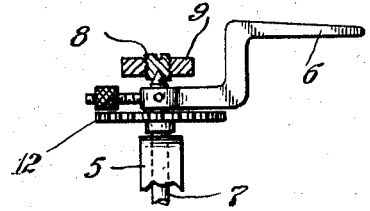
Fig. 5 is a detail view showing the mounting of the pointer.

In the modification shown in Figs. 3 and 4, the gear 16 mounted on shaft 17 is smaller than gear 18 on shaft 19 so that it turns several times for each revolution of gear 18. The shaft 19 mounts the rotor 20 and the pointer 21 which engages an electric contact member 22 to close an electric circuit for any purpose.

On shaft 17 is mounted an air vane 23. Since the gearing is reduced, the mass on shaft 17 is less than that of the rotor and other parts on shaft 19 and yet its relation thereto in view of the gear reduction is such that a rotative acceleration of the instrument in the plane perpendicular to that of the shaft axis will cause equal and opposing forces at the point of engagement of the gears 16 and 18 as has been disclosed in connection with Figs. 1 and 2.

The air vane on shaft 17 dampens the rotation of the pointer 21 on shaft 19 when the electric current in the meter is suddenly changed and reduces the usual oscillation thereof. This is possible because the gear relation and consequent speed of shaft 19 increases the effectiveness of the air vane which thus serves two purposes at once, i. e., cancelling swings of the pointer due to external forces and due to normal current changes.

I claim:

1. In a measuring instrument, indicating means rotatively mounted and balanced in respect to its center of rotation, said indicating means being adapted to move within a range not exceeding one turn, a balancing member rotatively mounted and balanced in respect to its center of rotation and engaging the indicating means through gearing means associated with the indicating means and the rotatable member, the balancing member and the indicating means being of such rotational inertia as to oppose each other with equal force at the point of engagement upon rotative external force being applied to the instrument.

2. A measuring instrument having a rotatable indicator member adapted to indicate within a range not exceeding one turn and being balanced in respect to its center of rotation, a gear associated therewith, a second member also rotatively mounted and balanced on its center of rotation and having a gear associated therewith, the gears being in mesh with each other and adapted to oppose rotative acceleration of said members by an external force.

3. A measuring instrument including an indicator member rotatively mounted and balanced in respect to its center of rotation, said indicator being adapted to move within an indicating range not exceeding one turn, a gear wheel associated therewith, a second member also rotatively mounted and balanced in respect to its center of rotation, a gear wheel on said second member, said first named wheel and second named wheel being in engagement, the amount of inertia of the two rotative systems being such as to cause substantially equal opposition at the engagement of the wheels in response to a rotational external force on the instrument.

4. A measuring instrument including a rotatable member balanced in respect to its axis of rotation, an indicator carried by said member, said indicator having an indicating range not exceeding one turn a second rotatable member balanced with respect to its axis of rotation, a coupling between the two rotatable members, the rotational inertia of the two members being of such relative magnitude that the members oppose each other with equal force at the point of coupling in response to an external rotational force applied to the instrument.

5. A measuring instrument including a rotatable member, an indicator carried by said member, said indicator having an indicating range not exceeding one turn a second rotatable member, each of said members having a balanced mass in respect to its axis of rotation with a peripheral edge, said peripheral edges engaging each other, said two rotatable members being of such relative inertia as to oppose each other approximately equally in response to an external rotational force applied to the instrument.

6. A measuring instrument including a rotatable member balanced in respect to its axis of rotation, an indicator carried thereby, and having an indicating range not exceeding one turn a toothed wheel associated therewith, a second rotatable member balanced in respect to its axis of rotation and in having a toothed wheel associated therewith, said members being operatively connected by engagement of said wheels, the moment of inertia of said rotatable members being such as to cause substantially equally opposed force at the point of engagement of the wheels in response to an external rotational force on the instrument.

7. A measuring instrument having an indicator rotatively mounted and substantially balanced in respect to its center of rotation, said indicator having an indicating range not exceeding one turn a second rotatively mounted member balanced with respect to its center of rotation, a coupling between the two rotative members, the rotational inertia of the two members being of such relative magnitude that the members oppose each other with equal force at the point of coupling in response to a rotatable external force applied to the instrument.

8. A measuring instrument having a rotatable member carrying an indicator, having an indicating range not exceeding one turn a second rotatable member, said rotatable members each being balanced in respect to its center of rotation and each having a peripheral portion, said peripheral portions being in continuous engagement and said rotatable members being of such relative inertia as to oppose each other approximately equally in response to a rotational external force applied to the instrument.

9. In a measuring instrument, the combination with a rotatively mounted member having an indicating range not exceeding one turn, of a device for stabilizing the movement of said member including a rotor, means coupling the rotor with said member, the rotatable member and the rotor being of a measured inertia whereby said rotor opposes the rotation of the member with an approximately equal force when an external rotative force is applied to the instrument.

10. In a device of the class described, the combination, of a rotatively mounted member having an indicating range not exceeding one turn, stabilizing means therefor comprising a rotor, means coupling the rotor to the member to turn therewith and to oppose by an approximately equal force a turning of the member due to an external rotational force applied to the device.

11. In a measuring instrument, a rotor, indicating means including a rotatable element operatively connected to said rotor and moved within a range not exceeding one turn, the connection between the rotor and the indicator being such that they oppose each other under the influence of a rotative force applied to the instrument, the inertia of the rotor and the indicator being such that the opposing forces are substantially equal whereby the rotor and indicating means remain substantially stationary when such rotative force is applied to the instrument.

LEON DEWAN.